United States Patent [19]

Cetrone

[11] Patent Number: 4,650,222

[45] Date of Patent: Mar. 17, 1987

[54] CONNECTERS FOR AIR AND VACUUM TUBES AND HOSES

[76] Inventor: Vincent B. Cetrone, 442 Fairway Dr. NE., Warren, Ohio 44583

[21] Appl. No.: 870,533

[22] Filed: Jun. 4, 1986

[51] Int. Cl.⁴ .............................................. F16L 39/00
[52] U.S. Cl. ................................ 285/137.1; 285/179; 285/331; 285/423
[58] Field of Search ...................... 285/423, 921, 137.1, 285/412, 260, 414, 331, 179; 29/522 A

[56] References Cited

U.S. PATENT DOCUMENTS

| | | | |
|---|---|---|---|
| 2,889,089 | 6/1959 | Hervick et al. | 285/423 X |
| 3,453,007 | 7/1969 | Roland | 285/137.1 |
| 3,640,552 | 2/1972 | Demler, Sr. et al. | 285/137.1 X |
| 3,673,541 | 6/1972 | Volinskie | 285/319 X |
| 3,758,138 | 9/1973 | Roseman | 285/137.1 X |
| 3,960,393 | 6/1976 | Hosokawa et al. | 285/423 X |
| 4,076,279 | 2/1978 | Klotz et al. | 285/137.1 X |
| 4,116,476 | 9/1978 | Porter et al. | 285/137.1 |
| 4,117,261 | 9/1978 | Blevins et al. | 29/522 A X |
| 4,288,108 | 9/1981 | Streit | 285/921 X |

FOREIGN PATENT DOCUMENTS

| | | | |
|---|---|---|---|
| 2305674 | 10/1976 | France | 285/137.1 |
| 2073836 | 10/1981 | United Kingdom | 285/260 |

Primary Examiner—Thomas F. Callaghan
Attorney, Agent, or Firm—Harpman & Harpman

[57] ABSTRACT

A vacuum or pressure coupling device comprises mateable body members, each provided with means for connection to tubular members and at least one of the body members being formed of material sufficiently resilient and distorable for maintaining the body members in sealing engagement with one another.

7 Claims, 5 Drawing Figures

CONNECTERS FOR AIR AND VACUUM TUBES AND HOSES

BACKGROUND OF THE INVENTION

1. Technical Field

This invention relates to multiple passage connecters for connecting air and vacuum tubes and hoses to one another.

2. Description of the Prior Art

Prior structures of this type usually employ rigid body members having yieldable nipple-like connecters positioned therethrough to which hose, tubes, and pipes may be connected.

See for example U.S. Pat. Nos. 3,454,007, 3,640,552, 3,673,541 and 4,076,279.

The present invention provides simple, inexpensive, mateable body members, at least one of which is sufficiently resilient and deformable to maintain the body members in sealing engagement when so engaged.

SUMMARY OF THE INVENTION

Composite connecters for air and vacuum tubes and hoses comprise mateable body members, at least one of which is formed of resilient, distortable, synthetic resin or the like defining passageways in tubular extensions of said body members, the tubular extensions provide simple and inexpensive sealing connection with hoses or tubes for hydraulic fluids, air pressure, vacuum lines, and the like so that a multiplicity of such hoses or tubes can be simultaneously and sealingly connected in an environmentally secure coupling, as for example in a multiple purpose air pressure and vacuum hose harness as used in present day automobiles.

DESCRIPTION OF THE PREFERRED EMBODIMENT

Figure 1:
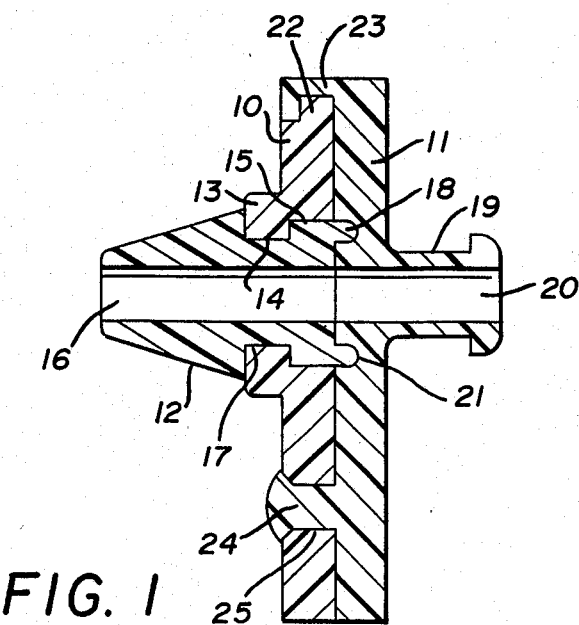
FIG. 1 is a vertical section through a multiple part connecter.

In one of the forms of the invention illustrated and described herein, the multiple part connecter seen in FIG. 1 of the drawings, combines two relatively rigid body members 10 and 11 with a resilient, distortable third body member 12. The body member 10 has a projecting annular collar 13 defining a circular opening 14 outwardly of a larger annular recess 15. The resilient, distortable body member 12 has a passageway 16 therethrough and an annular channel 17 adapted to register with the annular collar 13 of the body member 10. Additionally, the resilient, distortable body member 12 has an annular sealing rib 18 on its innermost end. The body member 11 has an integral tubular extension 19 defining a passageway 20 which registers with the passageway 16 in the resilient distortable body member 12. An annular groove 21 in the body member 11 sealingly receives the sealing rib 18 of the resilient distortable body member 12. A shoulder 22 on one end of the body member 10 receives a hook-shaped configuration 23 on the body member 11 to hold the body members in engaged relation and they are so secured by a pin 24 on the body member 11 positioned through an opening 25 in the body member 10 and distorted as by heat and pressure to form a rivet-like fastener.

Those skilled in the art will observe that tubes or hoses can be connected to the outer tapered surface of the resilient distortable body member 12 and the outer tubular surface of the tubular extension 19 of the body member 11 so that the coupling of the tubes or hoses is simplified and expedited by simply snapping the body members 10 and 11 together and fastening the same as hereinbefore described.

It will occur to those skilled in the art that the coupling device illustrated in FIG. 1 of the drawings may have a plurality of the tubular extensions 19 arranged for register with a plurality of the resilient, distortable body members 12 so that a plurality of hoses and/or tubes may be simultaneously connected by the coupling device.

Figure 3:
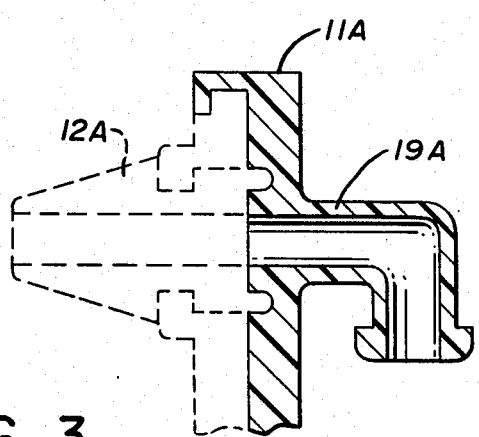
FIG. 3 is a vertical section of a variation of the multiple part connecter of FIG. 1.

In FIG. 3 of the drawings, a variation of the coupling device of FIG. 1 may be seen wherein the body member 11A has a tubular extension 19A with a right angular bend therein so that tubes or hoses connected with the resilient, distortable body member 12A, shown in broken lines in FIG. 3, may be sealingly connected with the right angular tubular extension 19A.

Figure 2:
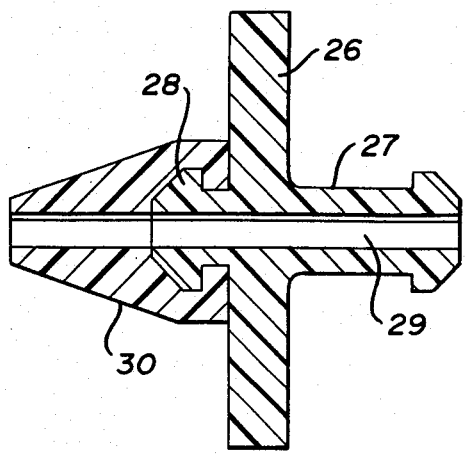
FIG. 2 is a vertical section through a two-part connecter.

By referring now to FIG. 2 of the drawings, a two-part coupling device may be seen wherein a body member 26 is provided with a pair of oppositely disposed tubular extensions 27 and 28 on the opposite sides thereof defining a passageway 29. A resilient distortable body member 30 is illustrated in snapped on position on the tubular extension 28. Tubes or hoses to be coupled are attached to the body member 30 as by cementing the same thereto and pushed onto the tubular extension 27 where they are held by frictional engagement therein.

Multiple tubular extensions 27 and 28 may be formed on the body member 26 and multiple resilient, distortable body members 30 join therewith after having seen secured to the ends of hoses, tubes, or pipes, as will be understood by those skilled in the art.

Figure 4:
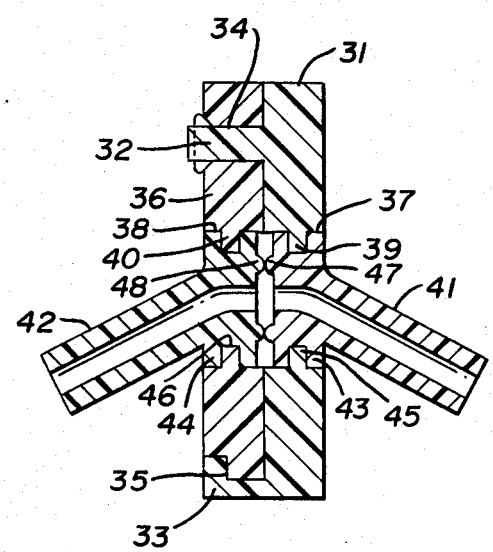
FIG. 4 is a vertical section through a four-part multiple connecter.

By referring now to FIG. 4 of the drawings, a still further modification of the coupling device may be seen wherein a body member 31 has a projecting pin 32 and a projecting hook 33 arranged for registry with an opening 34 and a transverse shoulder 35 on a body member 36, the body members 31 and 36 having annular openings 37 and 38 therein, each of which openings has an annular rib 39 and 40 therein. Tubular members 41 and 42 respectively, have enlarged circular ends 43 and 44 respectively, each of which has an annular groove 45 and 46 respectively, therein, the annular grooves 45 and 46 being engageable over the annular ribs 39 and 40 respectively, to sealingly engage the body members 31 and 41 and 36 and 42 respectively.

Additionally, there are mating annular ribs 47 and 48 respectively, on the inner ends of the tubular members 41 and 42 for sealing engagement with one another, it being understood that the tubular members 41 and 42 and their circular ends 43 and 44 are formed of resilient, distortable material.

Figure 5:
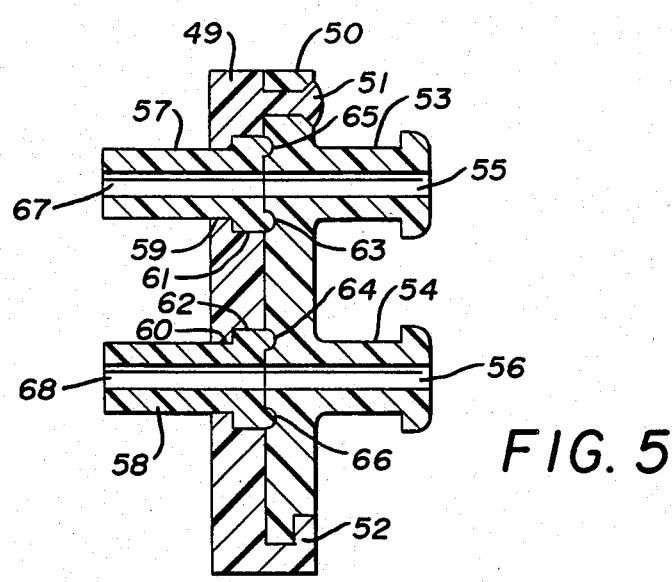
FIG. 5 is a vertical section through a modification comprising a four part connecter.

A further modification of the coupling device may be seen in FIG. 5 of the drawings wherein a body member 49 is joined to a body member 50 by a pin 51 and a hook configuration 52, the pin 51 being flattened by heat and pressure. Tubular extensions 53 and 54 define passageways 55 and 56 respectively, through the body member 50 and resilient, distortable tubular body members 57 and 58 respectively, are engaged in openings 59 and 60 in the body member 49. Each of the tubular body members 57 and 58 have enlarged end portions 61 and 62 which register in enlarged areas of the openings 60 and 61 and each of the enlarged end portions 61 and 62 have annular sealing ribs 63 and 64 thereon registrable in annular grooves 55 and 56 in the body member 50.

The resilient, distortable body members 57 and 58 define tubular passageways 67 and 68 respectively, which establish sealed communication with the passageways 55 and 56 in the body member 50, all as heretofore referred to.

It will thus be seen that the resilient, distortable body member 12 of FIG. 1 of the drawings as first described in this specification, is capable of being modified in form to the form illustrated in FIG. 2 where it comprises the body member 30, in FIG. 4 where it comprises the body members 41 and 42 and in FIG. 5 where it comprises the body members 57 and 58. In each modification, the resilient, distortable part of the coupling device acts to form a passageway for air or a vacuum as well as sealingly engaging a body member in which a communicating passageway is formed.

It will thus be seen that a comprehensive coupling device in several forms has been disclosed which provides a relatively easy and fast coupling of various tubular means, such as tubes, hoses, pipes and the like.

Although but four embodiments of the present invention have been illustrated and described, it will be apparent to those skilled in the art that various changes and modifications may be made therein without departing from the spirit of the invention and having thus described my invention, what I claim is:

1. A vacuum or pressure coupling device comprising first and second body members in mating engagement along abutting surfaces, integral tubular extensions on said first body member for respective attachment to tubular members and integral projecting annular portions on said second body member around openings and annular recesses in said second body member and resilient, distortable tubular body members for respective attachment to tubular members and having annular grooves in their outer surfaces positioned for engagement in said openings and registrable with said integral projecting annular portions and recesses in said second body member and means for removably securing said first and second body members to one another.

2. The vacuum or pressure coupling device set forth in claim 1 and wherein at least one of said integral tubular extensions on said first body member are formed in a right angular bend.

3. The vacuum or pressure coupling device set forth in claim 1 and wherein annular ribs are formed on said resilient, distortable tubular body members for sealing engagement with annular grooves formed in said first body member.

4. The vacuum or pressure coupling device set forth in claim 1 and wherein the means for removably securing the first and second body members to one another comprises pins on said first body member registrable in openings in said second body member, said pins being distortable by heat and pressure.

5. The vacuum or pressure coupling device set forth in claim 1 and wherein said first and second body members are molded plastic parts having a known degree of resiliency and wherein said resilient distortable tubular body members are molded plastic parts of relatively greater resilience and distortability than said first and second body members.

6. A vacuum or pressure coupling device comprising first and second body members in mating engagement along abutting surfaces, tubular extensions on said first and second body members in oppositely disposed relation, said tubular extensions comprising resilient, distortable tubular body members having enlarged annular end portions engageable in registering openings in said first and second body members, annular ribs on said first and second body members positioned in said openings and annular grooves in said enlarged annular end portions of said resilient, distortable tubular body members, and means for removably securing said first and second body members to one another.

7. The vacuum or pressure coupling device set forth in claim 6 and wherein annular sealing ribs are formed on said enlarged annular end portions of said resilient, distortable tubular body members and positioned for sealing engagement with one another.

* * * * *